United States Patent [19]
Duquesne

[11] 3,866,654
[45] Feb. 18, 1975

[54] DEVICE FOR INFLATING TUBELESS AUTOMOBILE TIRES

[76] Inventor: Victor Duquesne, Quellinstraat 42-44, Antwerpen, Belgium

[22] Filed: Nov. 22, 1972

[21] Appl. No.: 308,813

[30] Foreign Application Priority Data
Nov. 30, 1971 Belgium .................................. 51485
Feb. 14, 1972 Belgium .................................. 51662

[52] U.S. Cl. ................... 157/1.1, 137/223, 152/415
[51] Int. Cl. ............................................ B60c 29/12
[58] Field of Search ...... 157/1.1; 152/415; 239/526, 239/597, 601; 15/405; 137/608, 223

[56] References Cited
UNITED STATES PATENTS

| | | | |
|---|---|---|---|
| 695,967 | 3/1902 | Thurman .............................. | 15/405 |
| 2,344,492 | 3/1944 | Brubaker ............................. | 15/405 |
| 2,722,399 | 11/1955 | Oetiker ............................... | 137/608 |
| 3,552,469 | 1/1971 | Corless ............................... | 157/1.1 |
| 3,675,705 | 7/1972 | Corless ............................... | 157/1.1 |
| 3,683,991 | 8/1972 | Ruhland .............................. | 157/1.1 |

*Primary Examiner*—Al Lawrence Smith
*Assistant Examiner*—Harold P. Smith, Jr.
*Attorney, Agent, or Firm*—Ulle C. Linton

[57] ABSTRACT

A device used for inflating tubeless automobile tires, consisting of at least one tube shaped injection nozzle, the mouth piece of which is directed towards the spacing between the tire and the wheel rim for rapidly injecting air into the tire so as to spread the beads of the tire away from each other and to press them rapidly against the outer edges of the wheel rim, of a compressed air feed hose connected to aforesaid injection nozzle, of a source of compressed air connected to aforesaid feed hose, of a valve for controlling the air flow at the output of the injection nozzle and of a means adapted to the injection nozzle and connected to the wheel valve for bringing the tire up to the required pressure.

1 Claim, 3 Drawing Figures

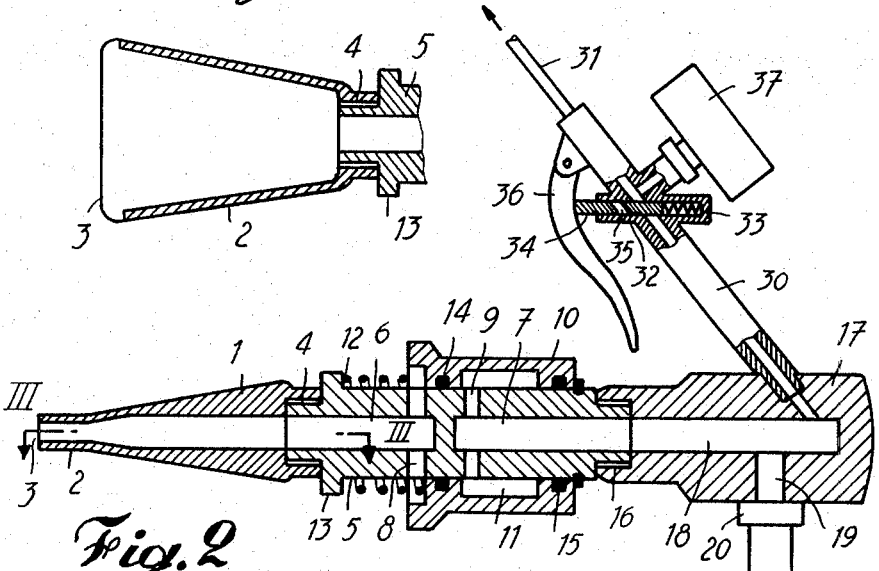
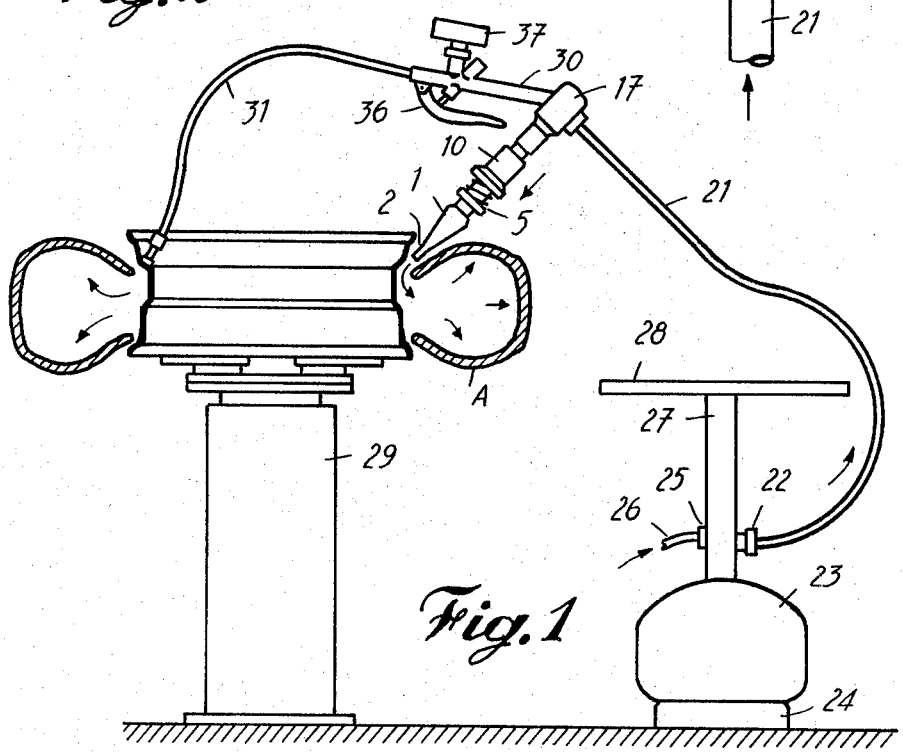

DEVICE FOR INFLATING TUBELESS AUTOMOBILE TIRES

The subject of the invention is a very simple device which permits the practically effortless and rapid inflation of tubeless automobile tires.

When a tire to be inflated is fitted on a wheel placed horizontally, the two beads of the tire rest loosely within the wheel rim with only a slight space between them. The upper bead of the tire is not in contact with the upper outer edge of the wheel rim. The compressed air which enters the tire through the valve, which is fitted in the wheel, escapes entirely through the space left open between the tire and the wheel rim, so that it is impossible to inflate the tire.

In order to cope with this difficulty, it is possible to make use of a device consisting of a bell cup placed upon the upper flank of the tire and covering the wheel rim, the latter as well as the lower flank of the tire resting upon a table. It is necessary previously to connect the hose of a conventional tire inflating device to the valve fitted in the wheel. When air is blown between tire and wheel rim by means of the bell, the beads of the tire move away from each other relatively fast and are pressed against the outer edges of the wheel rim, so that air no longer enters the tire through the bell but only through the hose which is connected to the valve, by which means the tire can be inflated to the desired pressure. the bell is suspended from a main structure and is provided with means for its up and down displacement.

The main inconveniences of this device are its large dimensions, its very high cost and the fact that the bell can not always be perfectly applied against the flank of the tire, so that in certain instances the air escapes, resulting in more time being required for inflating the tire.

In order once more to cope with these difficulties, it was suggested to use a device of greater simplicity, comprizing a high capacity compressed air tank connected to a source of compressed air and feeling a number of rigid pipes which are connected to a hollow ring placed horizontally and fitted above the tank, said ring being provided with openings obliquely directed towards the top. A hand operated valve is then provided to control the flow of air emitted by aforesaid ring. In this set-up the tire rests upon the ring and the wheel rim is located at the center of the ring. The diameter of the ring is chosen in such a manner that it locates close to the circumferential edge of the wheel rim. In this way air can easily be entered into the tire through the annular space existing between the tire and the wheel rim. As soon as the beads of the tire are pressed against the outer edges of the wheel rim, the tire can be brought up to the desired pressure by using the device connected to the wheel valve and which is conventially used for inflating tires.

The greatest disadvantage of this device is that it is not perfectly suitable for all diameters of wheels. If the diameter of the wheel is too small, it will be necessary to lift the wheel with one hand, so as to bring it above the ring and allow the air to flow correctly between the tire and the wheel rim. A further disadvantage consists in the fact that the wheel must be removed from the device used for fitting the tire to the wheel and must moreover be placed and centered upon the ring of the inflating device. Yet a further disadvantage is that the compressed air within the tire lifts the entire wheel, so that the pressure of the compressed air must be high and that a large compressed air tank is required in order to accomplish this effort.

In order to do away with these disadvantages and effectively press the beads of the tire against the wheel rim, the inventor, in accordance with the main characteristic of the present invention, has built a device mainly consisting of: at least one injection nozzle in the shape of a pipe, the opening of which is directed or eventually entered into the space between the tire and the wheel rim; a compressed air feed pipe connected on the one hand to a source of compressed air, preferably a compressed air tank, and on the other hand to aforementioned injection nozzle; a valve which permits the control of the flow of air at the output of aforesaid nozzle. This device moreover also makes use of the conventional device used for inflating tires and which is connected to the wheel valve in order to bring the tire up to the desired pressure.

This device according to the present invention is of very simple construction, relatively cheap, very easy to handle and is suitable for all wheel diameters, without requiring any adaptation of the device or any further manipulation of the wheel. It is consequently possible to inflate a tire of small diameter as well as that of a heavy duty truck. The tire may moreover remain on the apparatus which was used for fitting it on the wheel. A relatively small and portable compressed air tank will further be quite sufficient.

Merely as an example, and without any intent of limitation, a more detailed description of a form of embodiment of the device according to the invention will be given below.

This description refers to the appended drawing in which:

FIG. 1 is an over-all view of the device and of the lower part of a tire fitting device, together with a wheel and a tire fitted upon this wheel;

FIG. 2 is a longitudinal section of a prefered embodiment of the injection nozzle;

FIG. 3 is a cross section according to line III—III of FIG. 2.

In these figures it can be seen that injection nozzle 1 has a mouth piece 2 with a wide and flat opening 3 which is screwed upon the treaded portion 4 of injection nozzle body 5. This mouth piece 2 can easily be directed or entered between the bead of the tire which has to be inflated and the rim of a wheel of any diameter. Body 5 is provided with a bore 6 and the extension of this bore is provided with a second bore 7 which is separated from the first one. In each bore, respectively 6 and 7, there is provided a row of radial openings, respectively 8 and 9. Around body 5 a sliding sleeve 10 is located and is provided with an internal chamber 11 which can assure a communication between the two rows of radial openings, respectively 8 and 9, in such a manner that the air proceeding from bore 7 can penetrate into the other bore 6 which forms an extension to mouth piece 2. A compression spring 12, which is located between a collar 13 of body 5 and sliding sleeve 10, presses the latter towards its position of rest. In this position the two rows of radial openings 8–9 are not connected through to each other. Sealing rings 14–15 assure a tight fit between sliding sleeve 10 and body 5. Upon threaded part 16 of body 5 an extension 17 is screwed which is provided with a bore 18 which extends bore 7 of body 5. A passage 19 opens up into bore 17 and is connected by means of a fitting 20 to a flexible compressed air feed hose 21. The diameter of hose 21 has been chosen in such a way that a large quantity of compressed air can be fed into the tire within a very short time. On the other hand this hose is connected by means of a fitting 22 to a tank 23 which contains a sufficient quantity of air to be able to inflate the largest tire. This tank of relatively small dimensions rests upon a support 24 and is portable. Tank 23 is further also connected by means of a fitting 25 and a removable flexible hose 26 to a compressor (not shown), which is used for filling the tank. Tank 23 is provided with a column 27 fitted at the top with a table 28 upon which the wheel can be deposited. Mostly, the wheel will remain for inflating purposes on the fitting device 29 which was used for fitting the tire on the wheel. An outlet pipe 30 is screwed upon extension 17 and serves at the same time as a handle. To this pipe 30, which on the one hand opens up into bore 18, a flexible hose 31 has on the other hand been connected, the other end of which is fitted to the wheel valve in order to be able to bring the tire up to its required pressure. Pipe 30 is provided with a valve 32, compression spring 33 of which presses cylinder 34, which is provided with a passage opening 35, out of valve 32 in such a manner that the air feed in flexible hose 31 is shut off. A lever 36 is used to depress cylinder 34 and consequently open up valve 32. A pressure gauge 37 is fitted to pipe 30 and is used for measuring the air pressure in the tire.

For inflating a tire it is essential that tank 23 should contain a sufficient quantity of compressed air, which is always the case when hose 26 is connected to a compressor in operation. Next, the injection nozzle mouth piece 2 is entered or directed between the tire and the wheel rim, and sliding sleeve 10 is moved along body 5 in the direction of mouth piece 2 so that openings 8–9 are put into communication by means of chamber 11 of the sleeve. Air from tank 23 is then pressed at lightning speed and in a very large quantity into tire A through hose 21, channel 19, bores 18 and 7, opening 9, chamber 11, opening 8, bore 6 and mouth piece 2. In consequence, due to the instantaneous pressure inside the tire, the beads immediately spread away from each other and are pressed against the outer edges of the wheel rim. At this moment, mouth piece 2 is entirely enclosed between the adjacent bead of the tire and the wheel rim, in such a manner that the air supply to the tire is automatically shut off and that the air within the tire can no longer escape. Simultaneously a pull is exerted on lever 36 so that cylinder 34 is pushed in and that opening 35 is located along the extension of the channel of feed pipe 30. In this way air is admitted to the interior of tire A through hose 31 which has previously been connected to the wheel valve, so that the tire can be brought up to the required pressure.

It is quite obvious that the injection nozzle may be of any other shape than that described above as well as of any other dimensions and may be controlled in any other way. It is also needless to say that the injection nozzle may be connected to any suitable source of compressed air. It is also possible to make use of several nozzles and to place or fix them at various locations along the circumference of the wheel, whilst connecting them for instance to one common control valve.

What I claim is:

1. A device for inflating tubeless pneumatic tires on valved wheel rims comprising at least one open end tube shaped injection nozzle of which one open end constitutes an air outlet mouth piece of a flat configuration with a divergent bore and capable of insertion between a deflated tire bead and the rim of a wheel on which said tire is mounted and to inject a large quantity of compressed air into the tire, a compressed air feed hose, a source of compressed air being connected to said air feed hose, a main valve to which the other end of said nozzle is secured, said main valve being provided for the rapid controlling of the flow of air to said nozzle, an extension piece secured to said main valve and said air feed hose, an outlet pipe mounted on said extension piece and being in open communication therethrough with said feed hose, said outlet pipe extending obliquely towards said main valve and serving as a handle, an inflation valve in said outlet pipe, an inflation hose connected to said inflation valve, and a fitting on said air inflation hose being capable of connection to the wheel rim valve.

* * * * *